United States Patent
Ibrahim et al.

(10) Patent No.: US 7,580,483 B2
(45) Date of Patent: Aug. 25, 2009

(54) TRIMMING OF LOCAL OSCILLATION IN AN INTEGRATED CIRCUIT RADIO

(75) Inventors: Brima B. Ibrahim, Aliso Viejo, CA (US); Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 430 days.

(21) Appl. No.: 11/516,413

(22) Filed: Sep. 5, 2006

(65) Prior Publication Data

US 2007/0002974 A1 Jan. 4, 2007

Related U.S. Application Data

(63) Continuation of application No. 10/243,861, filed on Sep. 13, 2002, now Pat. No. 7,116,729, which is a continuation-in-part of application No. 10/134,797, filed on Apr. 29, 2002, now Pat. No. 7,079,595.

(51) Int. Cl.
*H04L 27/14* (2006.01)
*H04L 27/16* (2006.01)
*H04L 27/22* (2006.01)

(52) U.S. Cl. ........................ 375/326; 375/327; 375/325; 375/376; 375/344; 455/302; 455/340

(58) Field of Classification Search ................. 375/324, 375/319, 326, 327, 376, 375, 344; 455/302, 455/340; 327/156
See application file for complete search history.

(56) References Cited

U.S. PATENT DOCUMENTS

| | | | |
|---|---|---|---|
| 5,940,744 A * | 8/1999 | Uda | ............................ 455/75 |
| 6,600,378 B1 | 7/2003 | Patana | |
| 6,694,131 B1 * | 2/2004 | Lakkis | ........................ 455/302 |
| 7,116,729 B2 * | 10/2006 | Ibrahim et al. | ............... 375/324 |
| 2002/0160738 A1 | 10/2002 | Allott et al. | |
| 2005/0043001 A9 | 2/2005 | Toncich et al. | |

* cited by examiner

*Primary Examiner*—Phuong Phu
(74) *Attorney, Agent, or Firm*—Garlick Harrison & Markison (57) ABSTRACT

A method and apparatus for trimming of a local oscillation within a radio frequency integrated circuit (RFIC) includes processing that begins when an RFIC receives a radio frequency (RF) signal having a known frequency. The processing then continues when the RFIC mixes the RF signal with a receiver local oscillation to produce a low intermediate frequency (IF) signal, which may have a carrier frequency of zero (i.e., a baseband signal) or up to a few mega Hertz). The processing then continues when the RFIC demodulates the low IF signal to produce demodulated data. The processing then continues as the RFIC determines a DC offset from the demodulated data, where the DC offset is reflective of the difference between the known frequency and the frequency of the receiver local oscillation. The processing then continues as the RFIC adjusts the receiver local oscillation to reduce the DC offset when the DC offset compares unfavorably with an allowable offset threshold.

10 Claims, 7 Drawing Sheets

FIG. 3
FM radio receiver 100

FIG. 6
LO module 74

TRIMMING OF LOCAL OSCILLATION IN AN INTEGRATED CIRCUIT RADIO

CROSS REFERENCE TO RELATED APPLICATIONS

This application is a continuation of and claims priority to U.S. Patent Application having an application Ser. No. 10/243,861 and a filing date of Sep. 13, 2002, now U.S. Pat. No. 7,116,729, which application is a continuation-in-part of U.S. Patent Application having an application Ser. No. 10/134,797 and a filing date of Apr. 29, 2002, now U.S. Pat. No. 7,079,595; and in which both applications are incorporated herein by reference in this application.

BACKGROUND OF THE INVENTION

1. Technical Field of the Invention

This invention relates generally to wireless communication systems and more particularly to frequency modulated (FM) radio receivers used in such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel, or channels, (e.g., one or more of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel, or channels. To complete a communication connection between the wireless communication devices, the associated base stations and/or associated access points communicate with each other directly, via a system controller, via the public switch telephone network, via the internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter converts data into RF signals by modulating the data in accordance with the particular wireless communication standard to produce baseband signals and mixes the baseband signal with a local oscillation in one or more intermediate frequency stages to produce the RF signals. The radio receiver generally includes an antenna section, a filtering section, a low noise amplifier, an intermediate frequency (IF) stage, and a demodulator. The antenna section receives RF signals and provides them to the filtering section, which, in turn, passes RF signals of interest to the low noise amplifier. The low noise amplifier amplifies the received RF signals of interest and provides them as amplified RF signals to the IF stage. The IF stage steps down the frequency of the RF signals of interest to an intermediate frequency or to base-band. The IF stage provides the intermediate frequency signals or base-band signals to the demodulator, which recaptures the data in accordance with the demodulation protocol.

For the demodulator to accurately recover data from IF signals or baseband signals, DC offsets must be overcome. As is known, in frequency modulated (FM) systems, one source of DC offsets in the demodulated output result when the clock circuitry of a transmitting radio produces a slightly different clock rate than the clock rate produced by the receiving radio. In other words, the local oscillation within the transmitting radio does not produce the exact same rate of oscillation as the rate produced by the local oscillation in the receiving radio.

To correct for DC offsets, radio receivers include, within the demodulator, a DC offset detection circuit and DC offset compensation circuit. The DC offset detection circuit indicates the level of DC offset while the DC compensation circuit essentially removes the DC offset from the demodulated IF signals or baseband signals. While this technique compensates for DC offset, the frequency offset is present throughout the radio receiver. As is further known, the frequency offset is an error and its presence throughout most of the radio receiver processing can adversely affect the receiving processing function.

Therefore, a need exists for a radio receiver that directly removes the source of the DC offset before it is created.

BRIEF SUMMARY OF THE INVENTION

The method and apparatus for trimming of a local oscillation within a radio frequency integrated circuit (RFIC) as disclosed herein substantially meet these needs and others. One embodiment of such a method and apparatus includes processing that begins when an RFIC receives a radio frequency (RF) signal having a known frequency. The processing then continues when the RFIC mixes the RF signal with a receiver local oscillation to produce a low intermediate frequency (IF) signal, which may be a signal having a carrier frequency of a zero hertz to a few megahertz. As part of the mixing, the RFIC sets it receiver local oscillation to a frequency that is intended to match the known frequency. However, due to process variations in the fabrication of the RFIC and component tolerances, the frequency of the receiver local oscillation will most likely not exactly match the known frequency. The processing then continues when the RFIC demodulates the low IF signal to produce demodulated data. The processing then continues as the RFIC determines a DC offset from the demodulated data, where the DC offset is reflective of the difference between the known frequency and the frequency of the receiver local oscillation. The processing then continues as the RFIC adjusts the receiver local oscillation to reduce the DC offset when the DC offset compares unfavorably with an allowable offset threshold. In other words, the receiver local oscillation is adjusted such that its frequency more closely matches the known frequency, thereby reducing the DC offset and the adverse affects caused thereby.

Another embodiment of such a method and apparatus of the present invention include its use in a fractional-N frequency synthesizer generating the local oscillation using a crystal reference. Specifically, during test of a radio frequency integrated circuit (RFIC), the local oscillation module receives a crystal offset fractional value and generates a fractional-N divider value of the local oscillation based on the crystal offset fractional value, an integer value, and a set fractional value. During operation of the RFIC, the local oscillation module receives an operational offset fractional value and generates the fractional-N divider value based on the crystal offset fractional value, the integer value, the set fractional value, and the operational offset fractional value. As such, by adjusting the local oscillation to more closely match the RF frequency of received RF signals, frequency offset is reduced, as well as the adverse affects caused thereby.

DETAILED DESCRIPTION OF THE INVENTION

Figure 1:
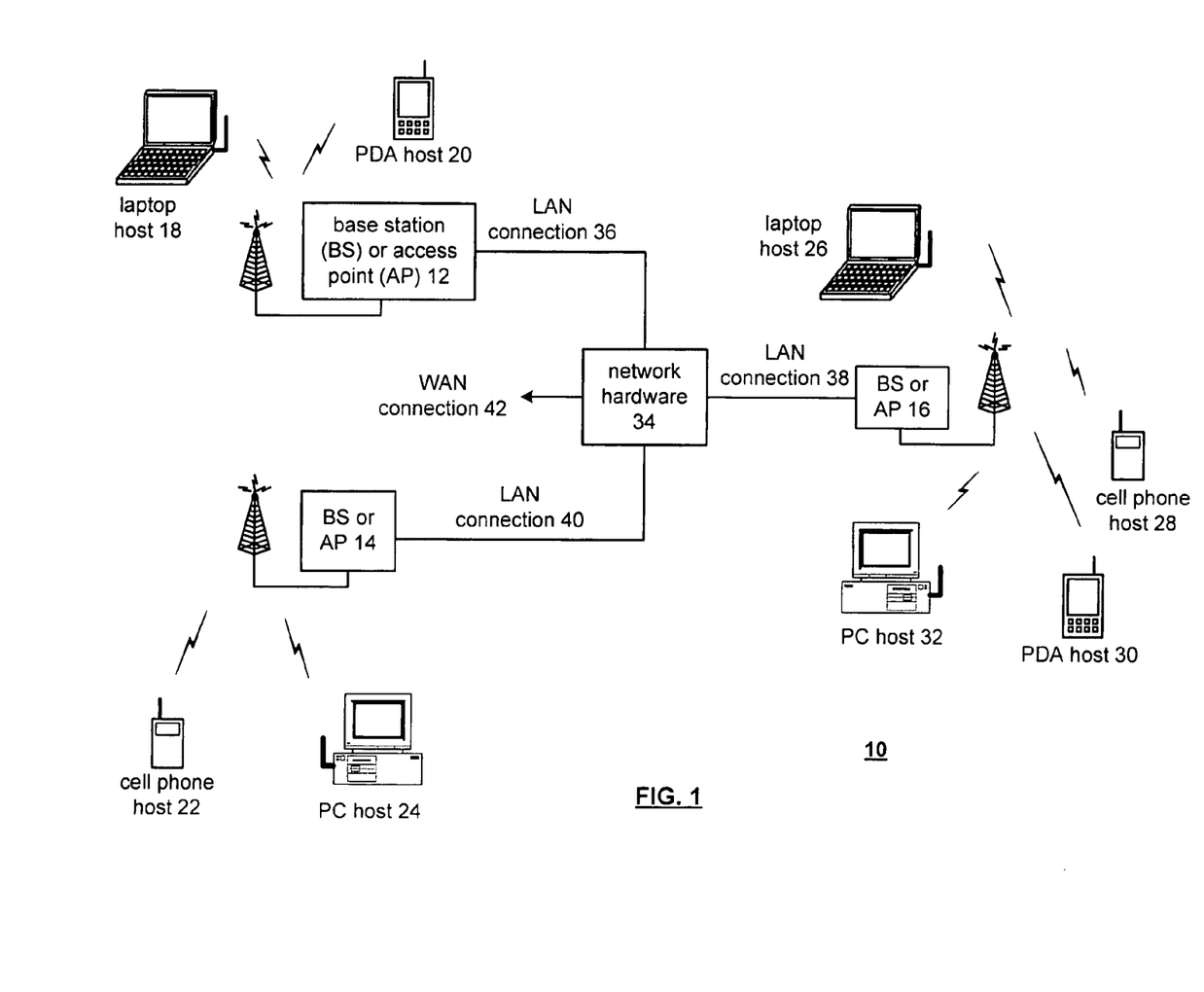
FIG. 1 is a schematic block diagram of a wireless communication system in accordance with the present invention.

FIG. 1 illustrates a schematic block diagram of a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a DC offset compensation concept as disclosed herein to enhance performance of radio receivers, including receivers within radio frequency integrated circuits.

Figure 2:
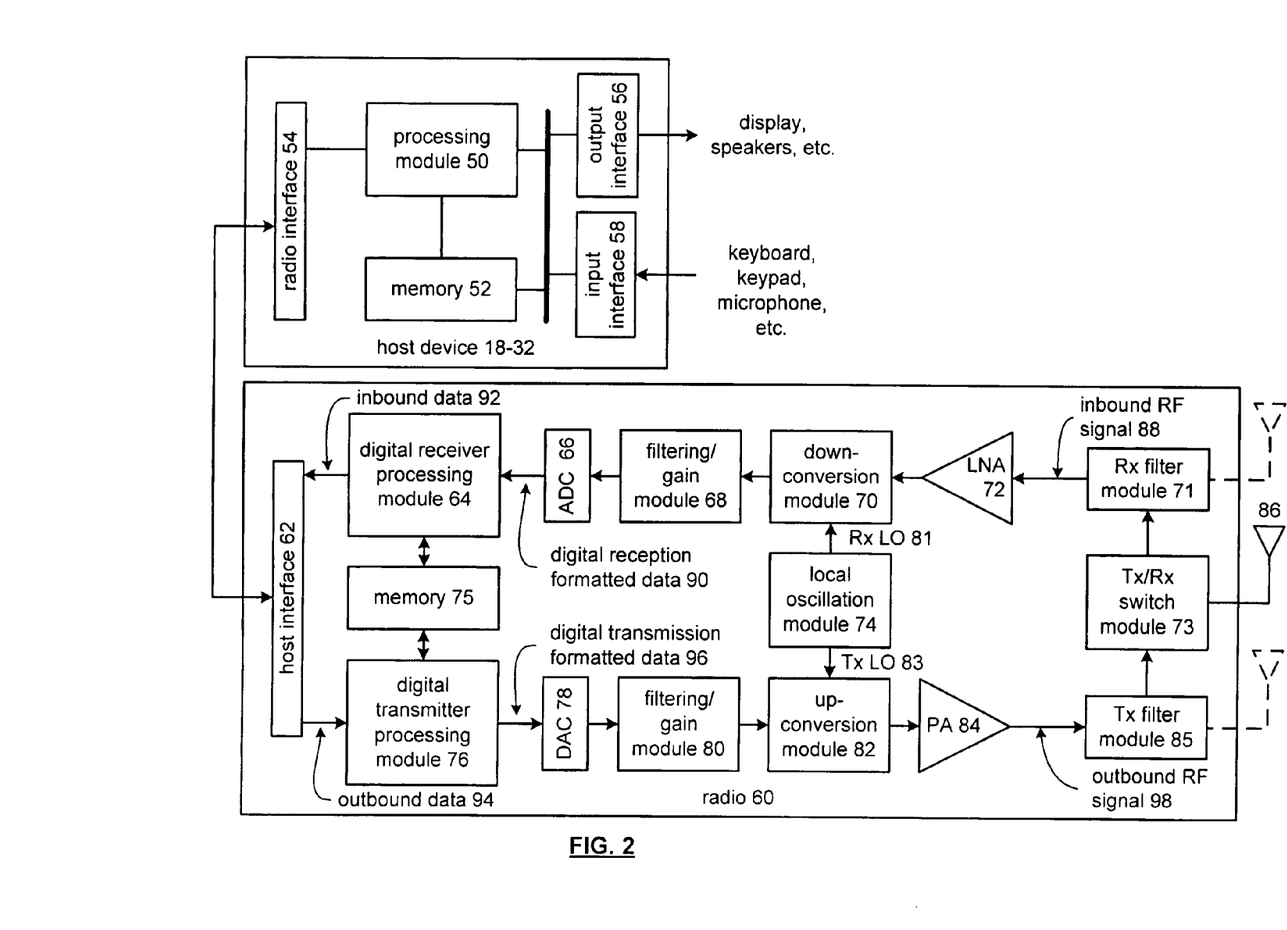
FIG. 2 is a schematic block diagram of a wireless communication device in accordance with the present invention.

FIG. 2 illustrates a schematic block diagram of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides outbound data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a receiver section, a transmitter section, local oscillation module 74, an antenna switch 73, and an antenna 86. The receiver section includes a digital receiver processing module 64, analog-to-digital converter 66, filtering/gain module 68, down conversion module 70, receiver filter module 71, low noise amplifier 72, and at least a portion of memory 75. The transmitter section includes a digital transmitter processing module 76, digital-to-analog converter 78, filtering/gain module 80, up-conversion module 82, power amplifier 84, transmitter filter module 85, and at least a portion of memory 75. The antenna 86 may be a single antenna that is shared by the transmit and receive paths via the antenna switch 73 or may include separate antennas for the transmit path and receive path and omit the antenna switch. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF will be in the frequency range of zero to a few megahertz.

The digital-to-analog converter 78 converts the digital transmission formatted data 96 from the digital domain to the analog domain. The filtering/gain module 80 filters and/or adjusts the gain of the analog signal prior to providing it to the up-conversion module 82. The up-conversion module 82 directly converts the analog baseband or low IF signal into an RF signal based on a transmitter local oscillation provided by local oscillation module 74, which may be implemented in accordance with the teachings of the present invention. The power amplifier 84 amplifies the RF signal to produce outbound RF signal 98, which are subsequently filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71, which filters the RF signal 88 and provides the filtered RF signal to the low noise amplifier 72. The low noise amplifier 72 amplifies the signal and provides the amplified inbound RF signal to the down conversion module 70, which directly converts the amplified inbound RF signal into an inbound low IF signal based on a receiver local oscillation provided by local oscillation module 74, which may be implemented in accordance with the teachings of the present invention. The down conversion module 70 provides the inbound low IF signal to the filtering/gain module 68, which filters and/or adjusts the gain of the signal before providing it to the analog to digital converter 66.

The analog-to-digital converter 66 converts the filtered inbound low IF signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the radio may be implemented a variety of ways to receive RF signals and to transmit RF signals and may be implemented using a single integrated circuit or multiple integrated circuits. Further, at least some of the modules of the radio 60 may be implemented on the same integrated circuit with at least some of the modules of the host device 18-32. Regardless of how the radio is implemented, the concepts of the present invention are applicable.

Figure 3:
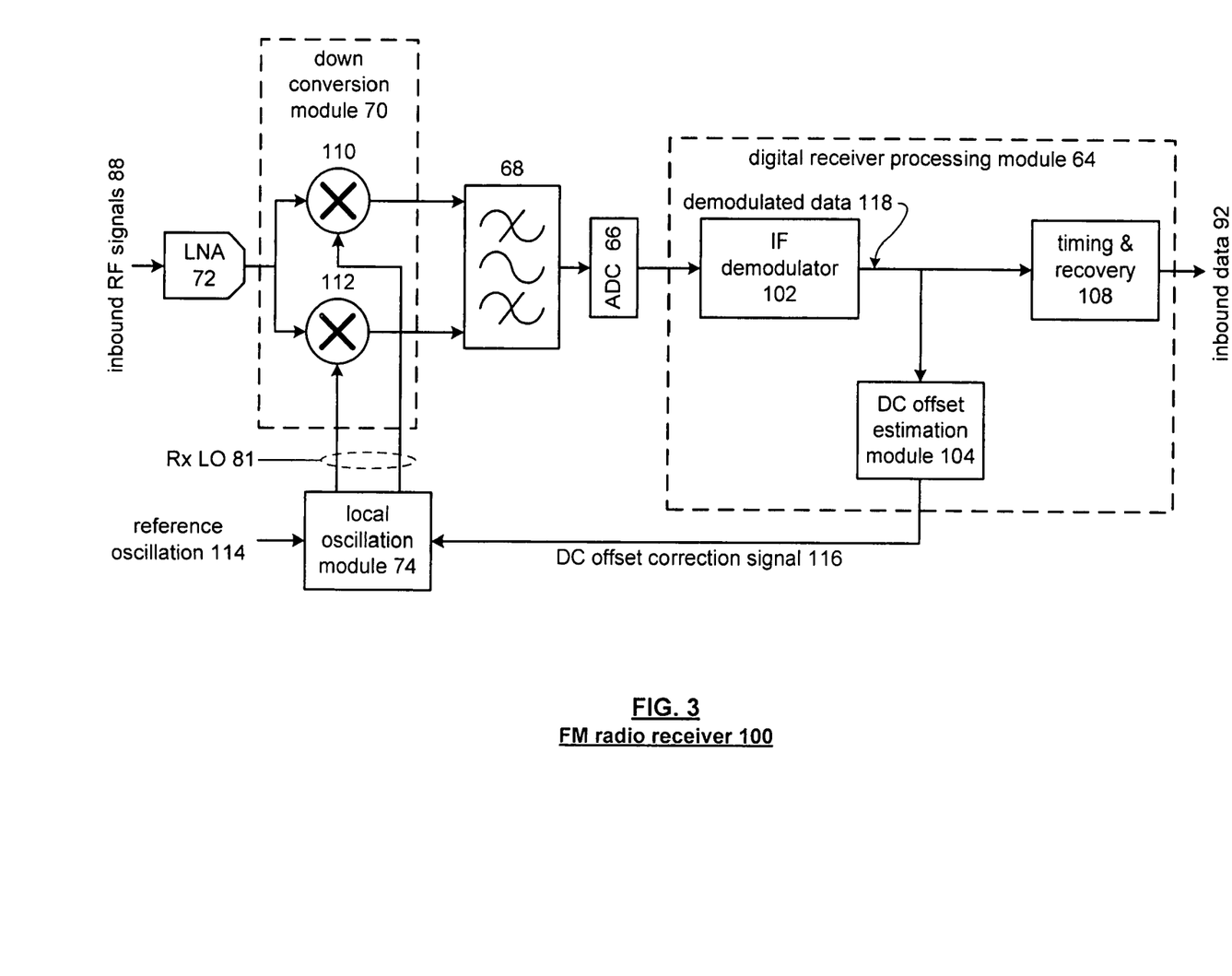
FIG. 3 is a schematic block diagram of an FM radio receiver in accordance with the present invention.

FIG. 3 illustrates a schematic block diagram of an FM radio receiver 100 that may be utilized in the wireless communication device of FIG. 2. The FM radio receiver 100 includes the low noise amplifier 72, down conversion module 70, a bandpass filter for the filtering gain module 68, the analog to digital converter 66, the local oscillation module 74, and the digital receiver processing module 64. In this implementation, the digital receiver processing module 64 is configured to function as an IF demodulator 102, a DC offset estimation module 104, and a timing and recovery module 108. The down conversion module 70 includes a $1^{st}$ mixer 110 and a $2^{nd}$ mixer 112.

In operation, the low noise amplifier 72 receives and filters inbound RF signals 88, which were produced by mixing baseband signals with a local oscillation within a transmitting radio. The filtered signals are provided to the $1^{st}$ and $2^{nd}$ mixers 110 and 112 of the down conversion module 70. The $1^{st}$ mixer 110 mixes an in-phase component of the RF signals 88 with an in-phase component of the receiver local oscillation 81. The $2^{nd}$ mixer 112 mixes a quadrature component of the RF signals 88 with a quadrature component of the receiver local oscillation 81. Initially, the receiver local oscillation 81 is generated solely based on the reference oscillation 114. As such, the receiver local oscillation 81 will most likely not match the local oscillation of the transmitting radio that transmitted the RF signals 88. As such, a DC offset will initially result.

The bandpass filter 68 filters the mixed signals produced by the down-conversion module 70 and provides a low IF signal to the analog to digital converter 66. The analog to digital converter 66 converts the low IF analog signals into low IF digital signals.

The IF demodulator 102 receives the digital IF signals, demodulates them via the IF demodulator 102, to produce demodulated data 118. The DC offset estimation module 104 interprets the demodulated data 118 to determine a DC offset value. The determined DC offset value is used to generate a DC offset correction signal 116, which is feed to the local oscillation module 74. As one of average skill in the art will appreciate, the DC offset estimation module 104 may determine the specific value that the local oscillation module is to be adjusted by and such information is contained within the DC offset correction signal 116. Alternatively, the DC offset correction signal 116 may include an indication of the value of the DC offset, such that the local oscillation module 74 may process the DC offset to determine the amount of local oscillation adjustment needed.

The timing and recovery module 108 receives the demodulated data 118 and produces therefrom inbound data 92. Initially, prior to direct DC offset compensation, the inbound data 92 may include errors. As such, it is desirable to generate the DC offset correction signal 116 and modify the receiver local oscillation 81 as soon as possible such that the inbound data 92 is corrected as quickly as possible. For instance, it is desirable to determine the DC offset correction signal 116 during a training sequence of the radio receiver or during the initial phases of receiving a preamble of a signal.

Figure 4:
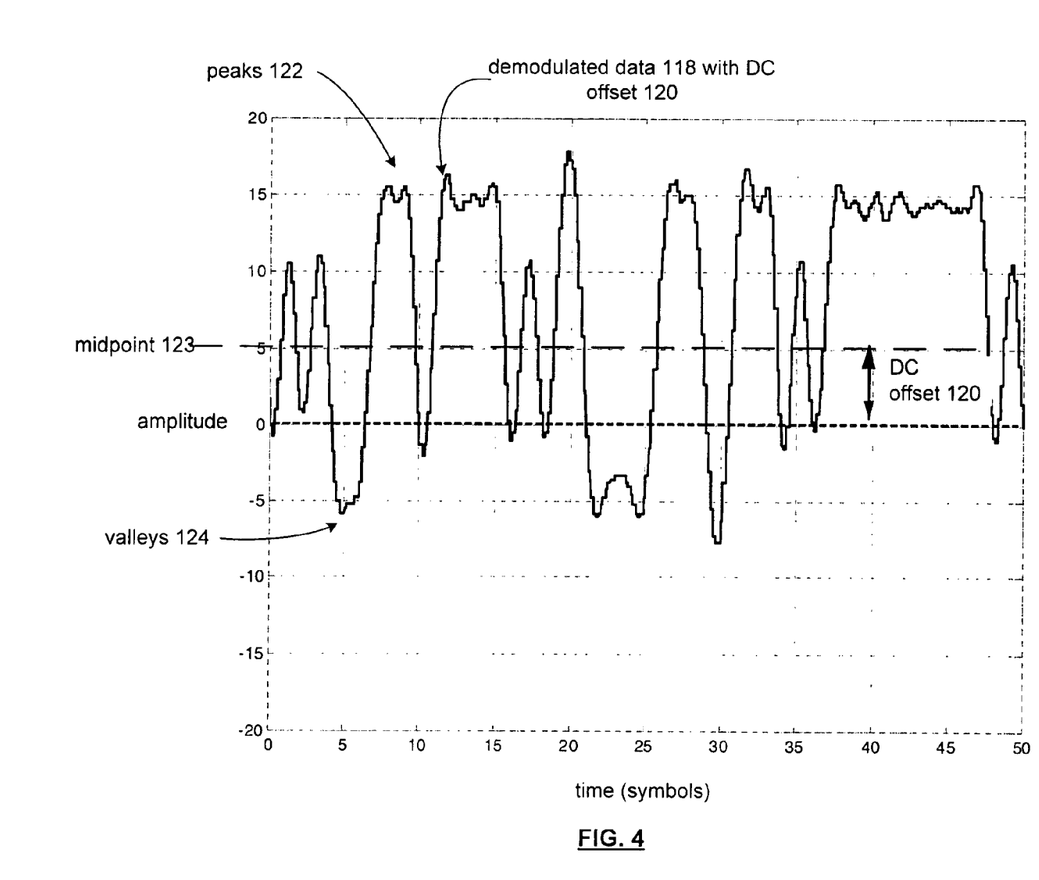
FIG. 4 is a graphical representation of typical demodulated data without DC offset correction.
Figure 5:
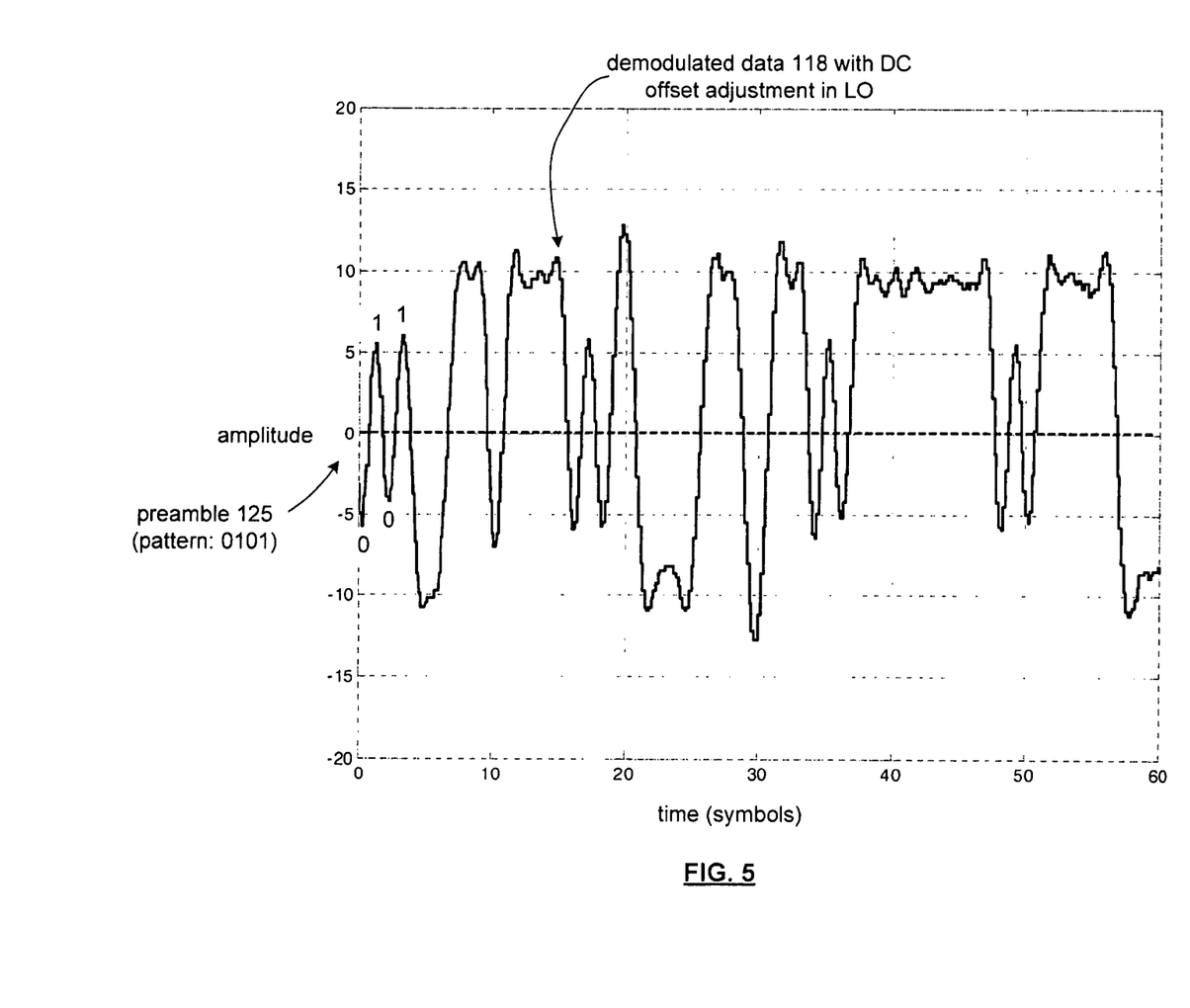
FIG. 5 is a graphical representation of typical demodulated data with DC offset correction in accordance with the present invention.

FIGS. 4 and 5 illustrate the demodulated data 118 with and without DC offset 120. In particular, FIG. 4 illustrates the demodulated data 118 with the DC offset. The peaks and valleys 122 and 124 of the demodulated data are identified. The DC offset estimation module 104 uses the peaks and valleys to determine a midpoint 123 between an average peak value and an average valley value. The DC offset estimation module 104 compares the midpoint 123 to zero amplitude and determines the DC offset 120 to be the difference between the midpoint 123 and the zero amplitude.

FIG. 5 illustrates the demodulated data 118 that is produced after the local oscillation is adjusted in accordance with the DC offset correction signal 116. In this particular example, the beginning of the demodulated data 118 includes a preamble 125, which has a particular pattern. In this example, the pattern is 0101. As such, it is desirable to generate the DC offset correction signal 116 during this preamble phase such that the receiver local oscillation 81 may be corrected (i.e., adjusted to match the local oscillation of the transmitting radio) to remove DC offset before it is created.

Figure 6:
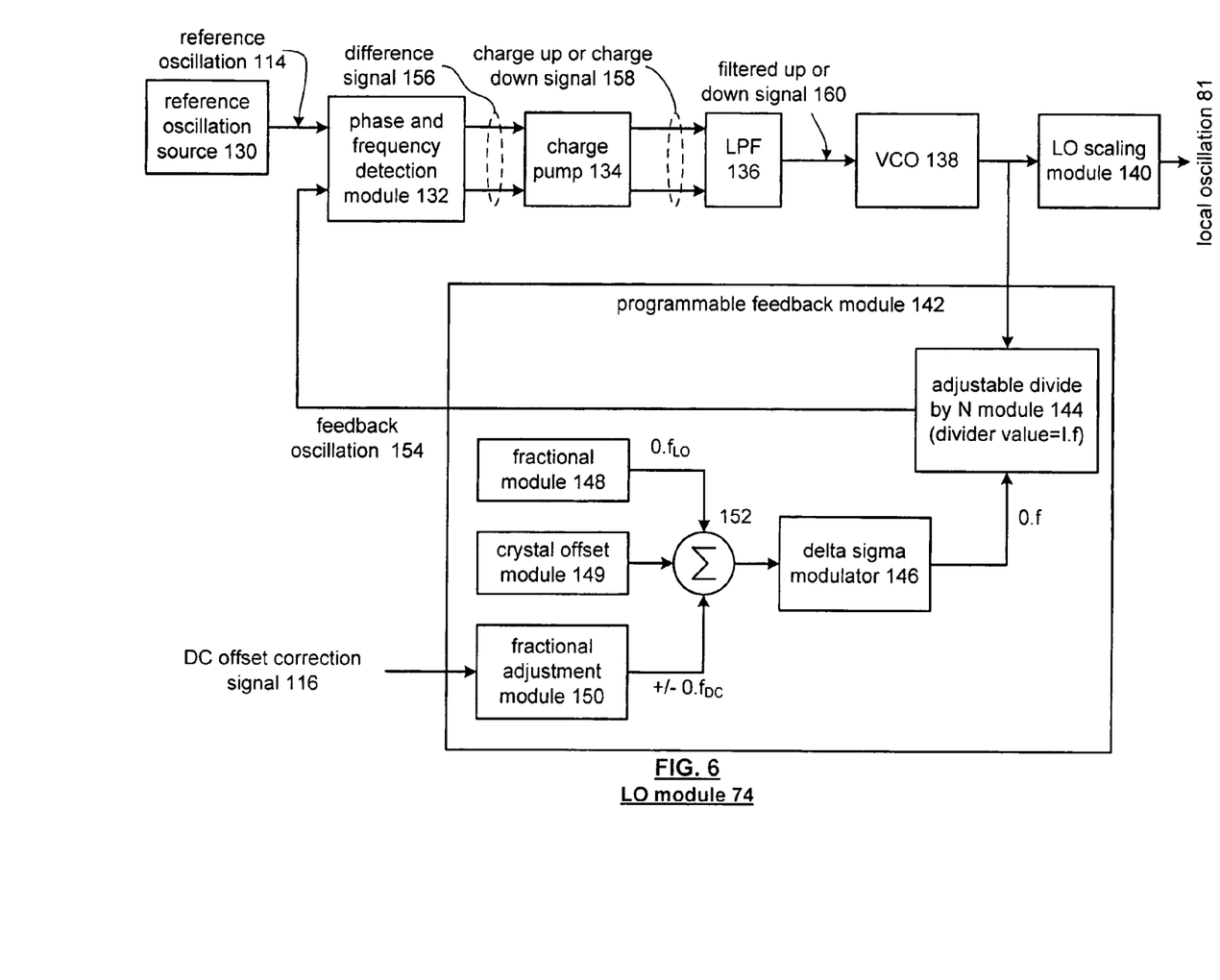
FIG. 6 is a schematic block diagram of a local oscillation module in accordance with the present invention.

FIG. 6 illustrates a schematic block diagram of the local oscillation module 74 and/or a self-correcting clock circuit that may be utilized in data recovery circuits. The local oscillation module 74 includes a reference oscillation source 130, a phase and frequency detection module 132, a charge pump 134, a low pass filter 136, a voltage control oscillator 138, a local oscillation scaling module 140, which is optional, and a programmable feedback module 142. The programmable feedback module 142 includes an adjustable divide by N-module 144, Delta Sigma modulator 146, fractional module 148, crystal offset module 149, fractional adjustment module 150, and a summing module 152.

The reference oscillation source 130, which may be a crystal, produces a reference oscillation 114. The phase and frequency detection module 132 compares the reference oscillation 114 with a feedback oscillation 154 to produce a difference signal 156. The charge pump 134 converts the difference signal into a charge-up signal or a charge-down signal 158. The low pass filter 136 filters the charge-up or charge-down signal to produce a filtered-up or filtered-down signal 160. The voltage control oscillator 138 generates an output oscillation in accordance with the filtered-up or filtered-down signal 160. The oscillation output is provided to the programmable feedback module 142 and may also be provided to a local oscillation scaling module 140. If the local oscillation module 74 does not include the local oscillation scaling module 140, the output of the VCO is the local oscillation 81.

The local oscillation scaling module 140 may be constructed in such a way that the output oscillation produced by the voltage control oscillator 138 is approximately ⅔rds the rate of the receiver local oscillation 81. As such, the scaling module 140 may divide the output oscillation from the voltage control oscillator 138 by 2 and then sum the divided by 2 value (i.e., ⅓rd of the desired local oscillation) with the output oscillation (i.e., ⅔rds of the desired local oscillation) to produce the local oscillation 81.

The adjustable divide by N-module 144 divides the output oscillation of the VCO 138 by a divider value. The divider value includes an integer portion, which is represented by I, and a fractional portion, which is represented by f. The fractional portion 0.f, is produced by a combination of the fractional portion (i.e., $0.f_{LO}$) stored in fractional module 148, a crystal offset fraction value stored in the crystal offset module 149, and a fractional adjustment portion (i.e., $0.f_{DC}$) produced by the fractional adjustment module 150. The fractional value ($0.f_{LO}$) corresponds to the desired fractional portion of the divider value. For instance, assume that the desired output frequency of the voltage control oscillator 138 is 1 gigahertz and the reference oscillation is 15 megahertz. As such, the divider value, predetermined local oscillation value, for this example is 66.6667. As such, the integer portion of the divider value for this example is 66 and the fractional value is 0.6667. If the reference oscillation were not exactly 15.0000 MHz, but, for example, were 15.002 MHz, then the output oscillation would be 1.000134 gigahertz (i.e., 15.002 MHz times 66.6667). Hence, the radio receiver has a crystal offset that will add to the DC offset, if not corrected.

To compensate for the crystal offset, the amount of offset is determined, as will be described in greater detail with reference to FIGS. 7 and 8, and this offset value is stored in the crystal offset module 149. In addition to the crystal offset, if the local oscillation of the transmitting radio, which produced the received RF signals, has a VCO output oscillation that does not match the VCO output of the receiver, DC offset will result, if not corrected. Continuing with the previous example, and having adjusted for the crystal offset, such that the receiver local oscillation is 1.000 gigahertz, and the transmitter's local oscillation is 1.002 gigahertz, the receiver will have a DC offset, if not corrected.

To compensate for the local oscillation offset (i.e., difference between the transmitter local oscillation and the receiver local oscillation), the fractional adjustment module 150 generates a fractional adjustment value based on the DC offset correction signal 116 to adjust the local oscillation 81 such that it substantially matches the local oscillation of the transmitting radio. For this example, the divider value to achieve a 1.002 gigahertz output from VCO 138 is 66.800. Since the fractional module is providing a fractional value of 0.667, the fractional adjustment module 150 needs to produce a fractional value of 0.133 (i.e., 0.800-0.667). The summing module 152 sums the fractional portion produced by fractional module 148 and the fractional adjustment value produced by the fractional adjustment module 150. The summed fractional portion is processed by the Sigma Delta modulator 146 to produce the resultant fractional value (i.e., 0.f), which adjusted the divider value of the adjustable divide by N-module 144 accordingly.

As one of average skill in the art will appreciate, the fractional adjustment module 150 may be a lookup table that includes a plurality of fractional adjustment values that are indexed by the DC offset correction signal. The indexed fractional adjustment value may then be stored in a register, which is provided to summing module 152. Alternatively, the fractional adjustment module 150 may include processing that determines the fractional adjustment value from the DC offset correction signal 116 to produce the desired fractional adjustment value. As a further alternative, the DC offset estimation module 104 may determine the fractional adjustment value such that the fractional adjustment module 150 includes a register for storing the fractional adjustment value. Regardless of the particular method for determining the fractional adjustment value, the DC offset is corrected by adjusting the local oscillation of the receiver to substantially match the local oscillation of the radio that transmitted the RF signals. As such, radio receivers have negligible DC offset, thus eliminating any potential errors associated with DC offsets.

Figure 7:
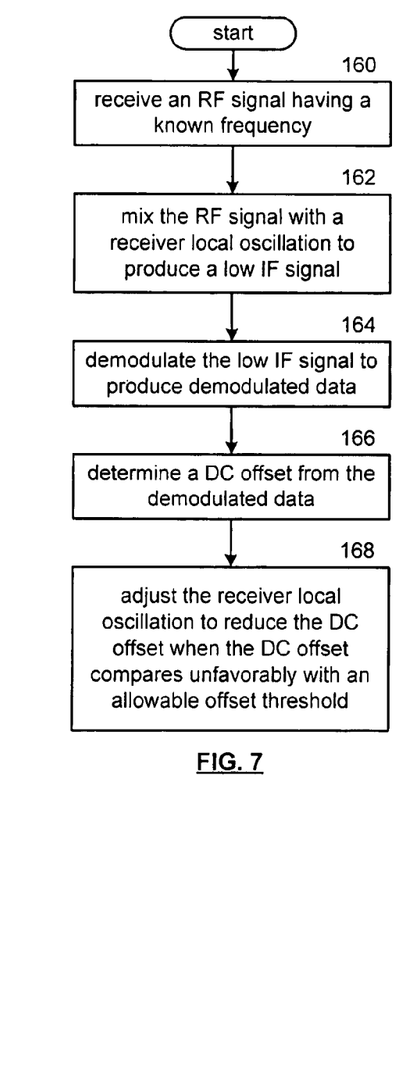
FIG. 7 is a logic diagram of a method for trimming a local oscillation in accordance with the present invention.

FIG. 7 illustrates a logic diagram that may be implemented by the RFIC of FIG. 2. The process begins at Step 160, where an RF signal having a known frequency is received. For example, the RF signal may be transmitted during the testing of the RFIC such that the frequency is known. The process then proceeds to Step 162 where the RF signal is mixed with a receiver local oscillation to produce a low IF signal. This step may include setting the receiver local oscillation based on the known frequency of the RF signal, i.e., set the receiver local oscillation to the channel on which the RF signal is transmitted.

The process then proceeds to Step 164 where the low IF signal is demodulated to produce demodulated data. This may be done by bandpass filtering the low IF signal to produce a filtered signal; converting the filtered signal into a digital signal, and demodulating the digital signal to produce the demodulated data. The process then proceeds to Step 166 where a DC offset from the demodulated data. The process then proceeds to Step 168 where the receiver local oscillation is adjusted to reduce the DC offset when the DC offset compares unfavorably with an allowable offset threshold. Such an allowable offset threshold may be based on bit size of the adjust values, i.e., the DC offset is less than resolution of the adjustment of the receiver local oscillation.

The adjusting of the receiver local oscillation may be done by determining whether the magnitude of the DC offset exceeds an upper limit of the allowable offset threshold or is below a lower limit. If so, the processing continues by determining a fractional adjustment value (e.g., crystal offset value) based on the DC offset such that the receiver local oscillation plus the carrier frequency of the low IF signal substantially equals the known frequency of the RF signal, wherein the receiver local oscillation is partially based on the fraction adjustment value. Alternatively, the adjustment of the receiver local oscillation may be an iterative process until the DC offset is at an acceptable level.

Figure 8:
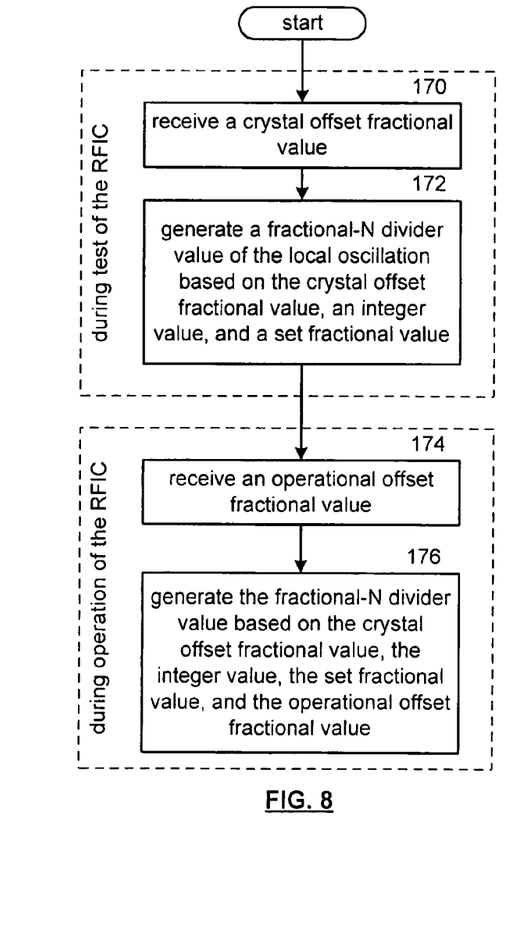
FIG. 8 is a logic diagram of an alternate method for trimming a local oscillation in accordance with the present invention.

FIG. 8 is a logic diagram of an alternate method for trimming a local oscillation in an RFIC. The process begins during test of the RFIC, where, at Step 170 a crystal offset fractional value is received. The crystal offset fractional value may be generated as described in FIG. 7. The process then proceeds to Step 172 where a fractional-N divider value of the local oscillation is generated based on the crystal offset fractional value, an integer value, and a set fractional value.

The process then proceeds, during operation of the integrated circuit radio, to Step 174 an operational offset fractional value is received. The operational offset fractional value may be generated as previously discussed with reference to FIG. 6. The process then proceeds to Step 176 where the fractional-N divider value is generated based on the crystal offset fractional value; the integer value, the set fractional value, and the operational offset fractional value.

The preceding discussion has presented a method and apparatus for trimming a local oscillation of an RFIC. By determining the crystal offset and correcting therefor, DC offset is reduce. As one of average skill in the art will appreciate, other embodiments may be derived from the teachings of the present invention without deviating from the scope of the claims.

What is claimed is:

1. A method comprising:
  mixing, by a mixer, a received radio signal with a local oscillation signal to produce a demodulated signal;
  determining a DC offset from the demodulated signal, wherein the DC offset is determined by finding a midpoint value between an average peak value and an average valley value of the demodulated signal and referenced to a zero amplitude level;
  determining if magnitude of the DC offset exceeds an upper limit of an allowable offset threshold or lower limit of the allowable offset threshold; and
  adjusting the local oscillation signal to reduce the DC offset to the zero amplitude level, when the magnitude of the DC offset exceeds the upper limit or the lower limit of the allowable offset threshold.

2. The method of claim 1 further comprising demodulating to produce the demodulated signal, wherein the demodulating includes bandpass filtering a mixed signal to produce a filtered signal, converting the filtered signal into a digital signal and demodulating the digital signal to produce demodulated data.

3. The method of claim 1, wherein the adjusting the local oscillation signal when the magnitude of the DC offset exceeds the upper limit or the lower limit of the allowable offset threshold includes, determining a fractional adjustment value based on the DC offset such that the local oscillation signal plus frequency of a mixed signal substantially equals a frequency of the radio signal, wherein the local oscillation signal is partially based on the fraction adjustment value.

4. The method of claim 1, wherein the adjusting the local oscillation signal when the magnitude of the DC offset exceeds the upper limit or the lower limit of the allowable offset threshold includes, iteratively adjusting a fractional adjustment value until the magnitude of the DC offset resides within the allowable offset threshold, wherein the receiver local oscillation is partially based on the fractional adjustment value.

5. The method of claim 1, wherein the adjusting the local oscillation signal when the magnitude of the DC offset exceeds the upper limit or the lower limit of the allowable offset threshold includes, adjusting a reference frequency based on the DC offset such that the local oscillation signal plus frequency of a mixed signal substantially equals a frequency of the radio signal, wherein the local oscillation signal is based on the reference frequency.

6. An apparatus comprising:
  means for mixing a received radio signal with a local oscillation signal to produce a demodulated signal;
  means for determining a DC offset from the demodulated signal, wherein the DC offset is determined by finding a midpoint value between an average peak value and an average valley value of the demodulated signal and referenced to a zero amplitude level;
  means for determining if magnitude of the DC offset exceeds an upper limit of an allowable offset threshold or lower limit of the allowable offset threshold; and
  means for adjusting the local oscillation signal to reduce the DC offset to the zero amplitude level, when the magnitude of the DC offset exceeds the upper limit or the lower limit of the allowable offset threshold.

7. The apparatus of claim 6 further comprising means for demodulating to produce the demodulated signal, wherein the means for demodulating demodulates by bandpass filtering a mixed signal to produce a filtered signal, converting the filtered signal into a digital signal and demodulating the digital signal to produce demodulated data.

8. The apparatus of claim 6, wherein the means for adjusting the local oscillation signal when the magnitude of the DC offset exceeds the upper limit or the lower limit of the allowable offset threshold includes, determining a fractional adjustment value based on the DC offset such that the local oscillation signal plus frequency of a mixed signal substantially equals a frequency of the radio signal, wherein the local oscillation signal is partially based on the fraction adjustment value.

9. The apparatus of claim 6, wherein the means for adjusting the local oscillation signal when the magnitude of the DC offset exceeds the upper limit or the lower limit of the allowable offset threshold includes, iteratively adjusting a fractional adjustment value until the magnitude of the DC offset resides within the allowable offset threshold, wherein the receiver local oscillation is partially based on the fractional adjustment value.

10. The apparatus of claim 6, wherein the means for adjusting the local oscillation signal when the magnitude of the DC offset exceeds the upper limit or the lower limit of the allowable offset threshold includes, adjusting a reference frequency based on the DC offset such that the local oscillation signal plus frequency of a mixed signal substantially equals a frequency of the radio signal, wherein the local oscillation signal is based on the reference frequency.

* * * * *